(12) United States Patent
Matsui et al.

(10) Patent No.: US 11,765,298 B2
(45) Date of Patent: Sep. 19, 2023

(54) IMAGE SENSOR UNIT

(71) Applicant: Mitsubishi Electric Corporation, Tokyo (JP)

(72) Inventors: Hideki Matsui, Tokyo (JP); Kazuya Makabe, Tokyo (JP); Kazuki Miyazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 17/641,817

(22) PCT Filed: Oct. 2, 2020

(86) PCT No.: PCT/JP2020/037660
§ 371 (c)(1),
(2) Date: Mar. 10, 2022

(87) PCT Pub. No.: WO2021/066181
PCT Pub. Date: Apr. 8, 2021

(65) Prior Publication Data
US 2022/0329706 A1 Oct. 13, 2022

(30) Foreign Application Priority Data

Oct. 4, 2019 (JP) ................................ 2019-184085

(51) Int. Cl.
*H04N 1/04* (2006.01)
*H04N 1/028* (2006.01)
(Continued)

(52) U.S. Cl.
CPC ......... *H04N 1/02835* (2013.01); *G02B 5/003* (2013.01); *G02B 5/208* (2013.01); *G02B 6/0005* (2013.01)

(58) Field of Classification Search
CPC .......... H04N 1/02835; H04N 1/00806; H04N 1/02895; H04N 1/00827; G02B 5/003; G02B 5/208; G02B 6/0005
See application file for complete search history.

(56) References Cited

U.S. PATENT DOCUMENTS

2014/0355303 A1 12/2014 Fujiuchi et al.
2015/0136951 A1* 5/2015 Ohama ................ H04N 1/1936
250/208.1
(Continued)

FOREIGN PATENT DOCUMENTS

JP 2012-190253 A 10/2012
JP 2014-6979 A 1/2014
(Continued)

OTHER PUBLICATIONS

International Search Report and Written Opinion dated Dec. 15, 2020, received for PCT Application PCT/JP2020/037660, Filed on Oct. 2, 2020, 10 pages including English Translation.
(Continued)

*Primary Examiner* — Huo Long Chen
(74) *Attorney, Agent, or Firm* — XSENSUS LLP

(57) ABSTRACT

An image sensor unit includes: a visible light cut filter that is arranged between a first light source and a first light guide and blocks light including visible light having wavelengths longer than those of ultraviolet light; a lens body that condenses light generated on a reading target by light radiated from the first light guide and light radiated from a second light guide; a line sensor that receives the light condensed by the lens body; and an ultraviolet light cut filter arranged between the lens body and the line sensor and blocks ultraviolet light.

14 Claims, 13 Drawing Sheets

(51) Int. Cl.
*G02B 5/00* (2006.01)
*G02B 5/20* (2006.01)
*F21V 8/00* (2006.01)

(56) References Cited

U.S. PATENT DOCUMENTS

| 2015/0381848 | A1* | 12/2015 | Matsui | H04N 1/02885 |
| | | | | 358/482 |
| 2016/0234445 | A1* | 8/2016 | Shimoda | G02B 6/001 |
| 2018/0096553 | A1 | 4/2018 | Horiguchi | |
| 2019/0379801 | A1* | 12/2019 | Matsuzawa | G03B 27/54 |

FOREIGN PATENT DOCUMENTS

| JP | 2016-5130 A | 1/2016 |
| JP | 2019-79765 A | 5/2019 |
| WO | 2014/129549 A1 | 8/2014 |
| WO | 2016/158840 A1 | 10/2016 |

OTHER PUBLICATIONS

Notice of Reasons for Refusal dated Nov. 2, 2021, received for JP Application 2021-551630, 14 pages including English Translation.
Notice of Reasons for Refusal dated Jan. 18, 2022, received for JP Application 2021-551630, 16 pages including English Translation.

* cited by examiner

FIG.4A
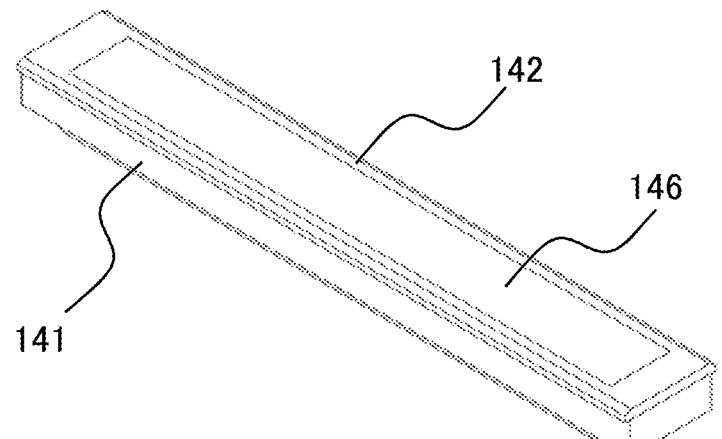
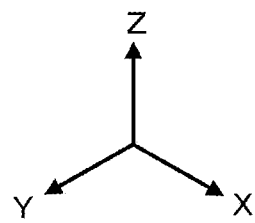
FIG.4B
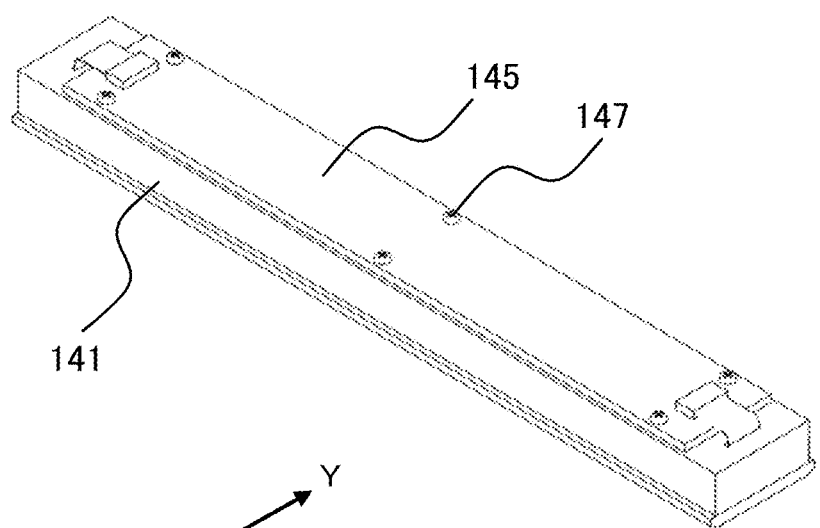
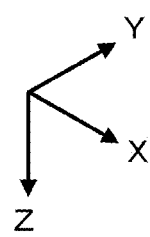

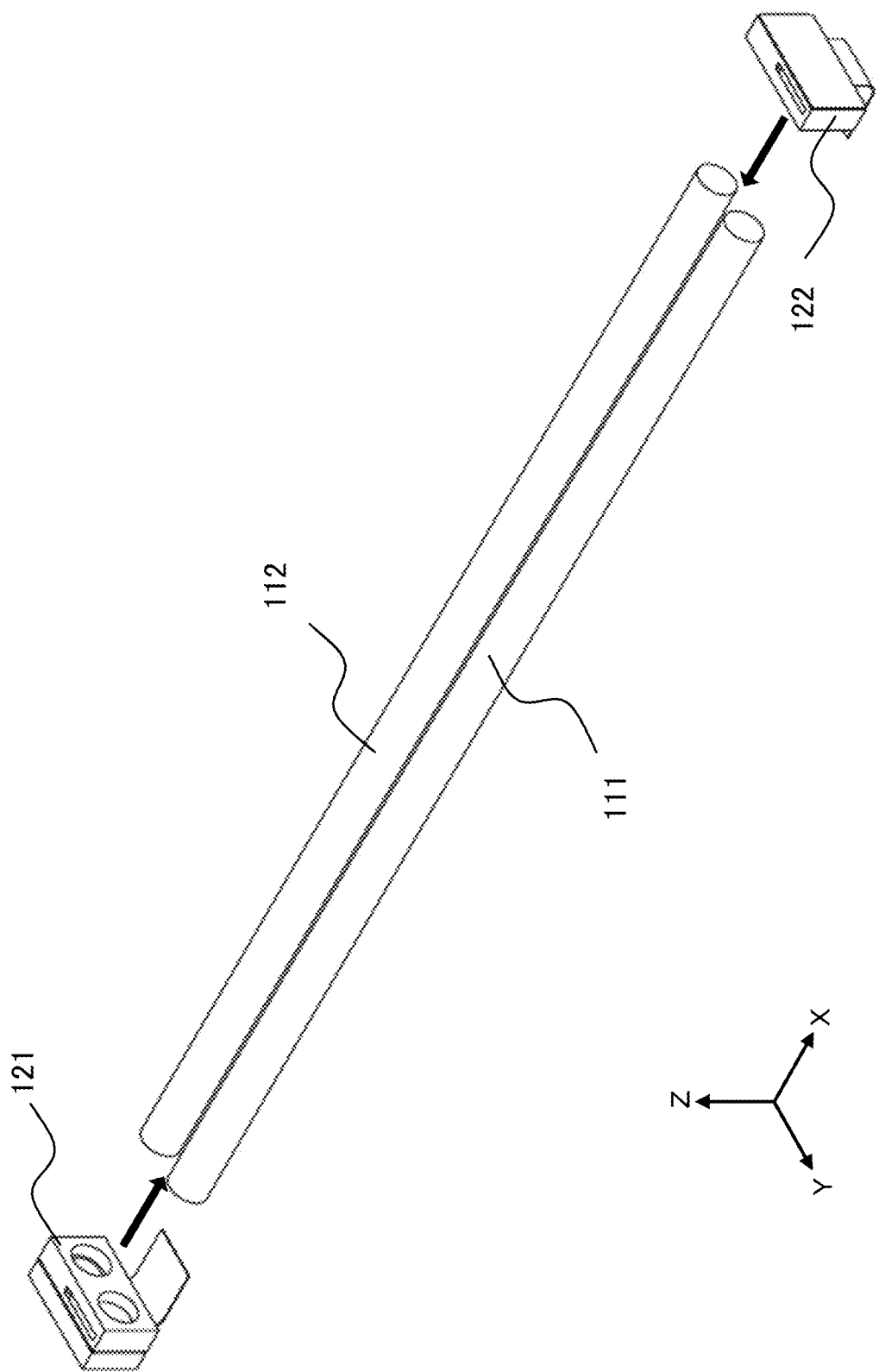

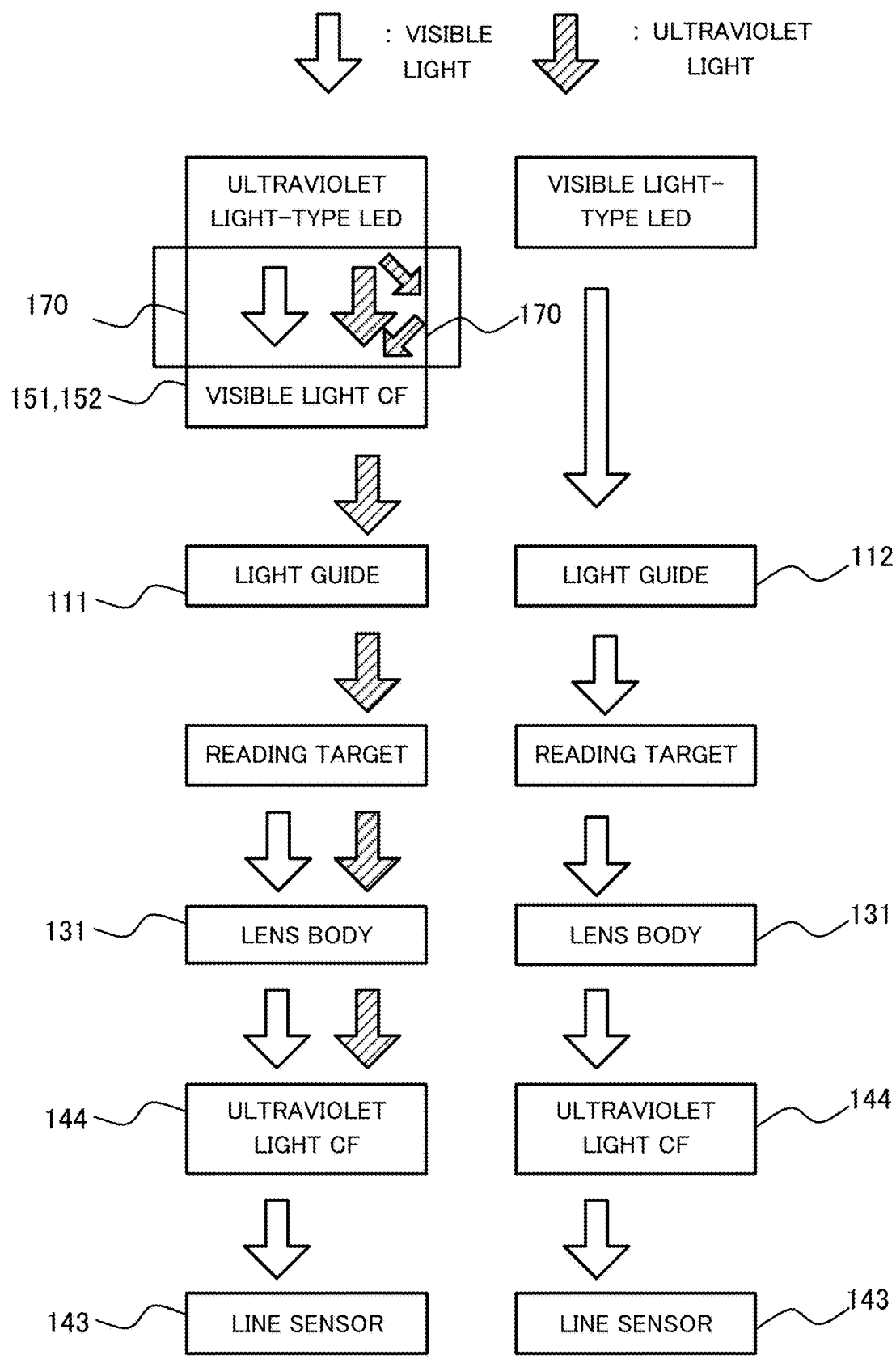

IMAGE SENSOR UNIT

CROSS-REFERENCE TO RELATED APPLICATIONS

The present application is based on PCT filing PCT/JP2020/037660, filed Oct. 2, 2020, which claims priority to JP 2019-184085, filed Oct. 4, 2019, the entire contents of each are incorporated herein by reference.

TECHNICAL FIELD

The present disclosure relates to an image sensor unit.

BACKGROUND ART

An image sensor unit that generates an image of a reading target is used in a wide variety of applications, and is used by incorporation into, for example, a copier, a multifunctional printer, a facsimile device, a scanner device, and an ATM. The image sensor unit generally includes therein a light source, a light guide, a lens body, and a line sensor.

The light source of the image sensor unit includes a light source for emission of light of various wavelengths, enabling detection of an ink, of the reading target, that has reactivity to light having a specific wavelength (refer to, for example, Patent Literature 1). Patent Literature 1 discloses a method for detecting a fluorescent component generated on a valuable paper by irradiation onto the valuable paper by ultraviolet light sources arrayed on an image sensor unit.

In such an image sensor unit, the irradiation by ultraviolet light leads to occurrence on the valuable paper of the fluorescence reaction and reflection at the same time, causing a problem in that both fluorescence light and reflected ultraviolet light are read. Further, since the light emitted from the ultraviolet light sources includes light of a wavelength that is different from the ultraviolet light, using the image sensor to distinguish the fluorescent component derived from the ultraviolet light from the light component included in the light sources is difficult.

To address these problems, the optical line sensor device disclosed in Patent Literature 1 includes (i) a first filter that is arranged on an emission side of ultraviolet light-type LEDs and that filters out non-ultraviolet light and (ii) a second filter that is arranged on an optical path between a medium and a sensor and that filters out ultraviolet light. These filters enable preventing direct entrance into a light receiver of the non-ultraviolet components that are emitted from the ultraviolet light-type LEDs, and also enable preventing entrance into the light receiver of ultraviolet light that is emitted from the ultraviolet light-type LEDs and reflected by the medium. Such configuration is described as improving the ability to detect a fluorescent substance on the medium.

Further, in some image sensor units, linear light is radiated onto a reading target by causing light emitted by a light emitter, which is visible light or non-visible light that have predetermined wavelengths, to transmit by reflection inside light guides (refer to, for example, Patent Literature 2). The light source device disclosed in Patent Literature 2 includes optical filters between light emitters and end portions of light guides, and is described as a device that enables the maintaining of illumination characteristics by the inclusion of a mechanism that maintains a constant distance between the optical filters and the light emitters even in a case of expansion or contraction of the light guides due to a change in temperature.

CITATION LIST

Patent Literature

Patent Literature 1: Unexamined Japanese Patent Application Publication No. 2012-190253
Patent Literature 2: Unexamined Japanese Patent Application Publication No. 2014-6979

SUMMARY OF INVENTION

Technical Problem

To prevent counterfeiting of the valuable paper, in addition to the ink having fluorescent reactivity to ultraviolet light, multiple types of ink are used that have reflectivity for a specific wavelength. For a reading target including such valuable paper, the optical line sensor device disclosed in Patent Literature 1 cannot detect substances other than the fluorescent substance having fluorescent reactivity to ultraviolet light, since wavelengths of non-ultraviolet light are blocked.

Additionally, the light source device disclosed in Patent Literature 2 includes filters that are arranged between the light sources and the light guides and that filter out frequencies within a predetermined range, and thus does not have a configuration that is applicable to a reading target for which detection is to be performed by using both an ultraviolet light source and a visible light source.

The present disclosure is made to solve the aforementioned problems, and an objective of the present disclosure is to obtain an image sensor unit enables both (i) low-noise detection of fluorescence light derived from ultraviolet light and (ii) stable detection by light of non-ultraviolet light wavelengths.

Solution to Problem

To achieve the aforementioned objective, an image sensor unit according to the present disclosure includes (i) a first light source to emit light including ultraviolet light, (ii) a second light source to emit light including visible light having wavelengths longer than those of ultraviolet light, (iii) a columnar first light guide to guide the light emitted by the first light source from both end surfaces thereof and to radiate, from a side surface thereof, the light toward a reading target, and (iv) a columnar second light guide to guide the light emitted by the second light source from both end surfaces thereof and to radiate, from a side surface thereof, the light toward the reading target, and further includes (v) a visible light cut filter arranged between the first light source and the first light guide and to block the light including visible light having wavelengths longer than those of ultraviolet light, (vi) a lens body to condense light generated on the reading target by the light radiated from the first light guide and the light radiated from the second light guide, (vii) a line sensor to receive the light condensed by the lens body, and (viii) an ultraviolet light cut filter arranged between the lens body and the line sensor and to block ultraviolet light.

Advantageous Effects of Invention

According to the present disclosure, the visible light cut filter blocks components other than ultraviolet light emitted by the first light source and the ultraviolet light cut filter blocks a reflection component of ultraviolet light, thereby enabling low-noise detection of fluorescence light derived from ultraviolet light. Additionally, since visible light emitted by the second light source passes through the ultraviolet light cut filter without passing through the visible light cut filter, stable detection by light emitted by a non-ultraviolet wavelength can be achieved.

BRIEF DESCRIPTION OF DRAWINGS

FIG. 4A is an external view of the image sensor unit and is a perspective view as seen from above;

FIG. 4B is an external view of the image sensor unit and is a perspective view as seen from below;

FIG. 7 illustrates a process for manufacturing the image sensor unit;

FIG. 13 illustrates behaviors of visible light and ultraviolet light in an image sensor unit according to Embodiment 4.

DESCRIPTION OF EMBODIMENTS

Embodiment 1

Figure 1:
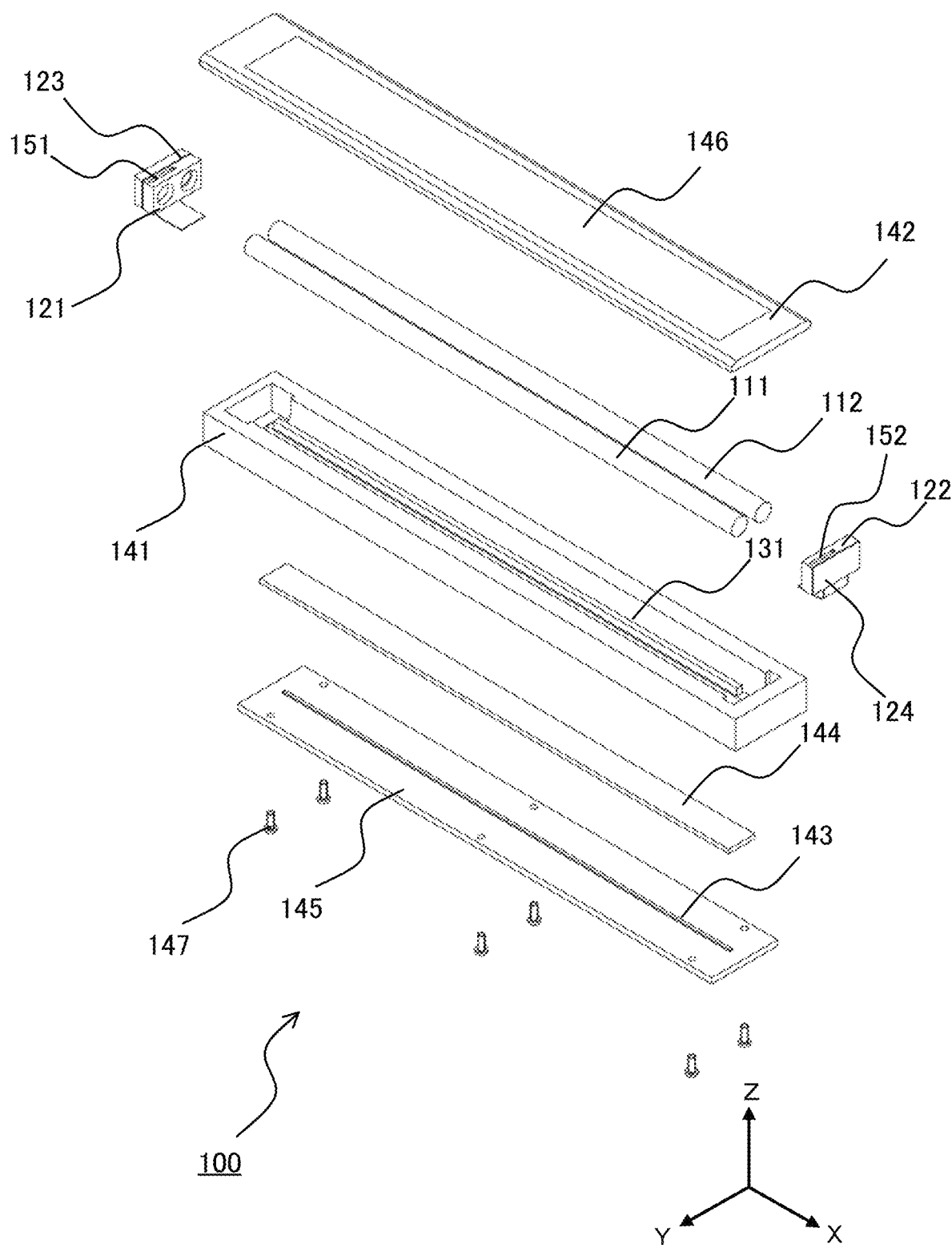
FIG. 1 is an exploded perspective view of an image sensor unit according to Embodiment 1.

Hereinafter, an image sensor unit 100 according to Embodiment 1 of the present disclosure is described with reference to the drawings. FIG. 1 is an exploded perspective view of the image sensor unit 100 according to Embodiment 1 and illustrates a longitudinal direction of the image sensor unit 100 as an X-axis direction, a lateral direction as a Y-axis direction, and a height direction perpendicular to the longitudinal direction and the lateral direction as a Z-axis direction. The longitudinal direction and the lateral direction of the image sensor unit 100 according to Embodiment 1 correspond to a main scanning direction and a sub-scanning direction of the image sensor unit 100, respectively.

As illustrated in FIG. 1, the image sensor unit 100 includes two light guides 111 and 112 arranged parallel to each other and light guide holders 121 and 122 that support both ends of the light guides 111 and 112. Further, the image sensor unit 100 includes (i) LED boards 123 and 124 on which are mounted LEDs for radiating light onto end surfaces of the light guides 111 and 112 and that each are bonded to a corresponding one of the light guide holders 121 and 122 and (ii) visible light cut filters 151 and 152 arranged between each of both the end surfaces of the light guide 111 and a corresponding one of the LED boards 123 and 124.

Additionally, the image sensor unit 100 includes (i) a lens body 131 that condenses fluorescence light or reflection light generated on a reading target by light emitted from side surfaces of the light guides 111 and 112 and (ii) a frame-shaped frame 141 that houses the light guides 111 and 112 and the lens body 131. Moreover, the image sensor unit 100 includes (i) a cover 142 that covers at least a part of an opening in the upper side of the frame 141, (ii) a line sensor 143 that receives light condensed by the lens body 131, (iii) an ultraviolet light cut filter 144 arranged between the lens body 131 and the line sensor 143, and (iv) a sensor board 145 on which is mounted the line sensor 143 along the longitudinal direction of the light guides.

The reading target that is a target of image reading by the image sensor unit 100, when the image reading is performed, moves along a surface of the cover 142 relative to the image sensor unit 100 in the sub-scanning direction that is the lateral direction. The image sensor unit 100 may move relative to the reading target that is fixed, or alternatively, the reading target may move relative to the image sensor unit 100 that is fixed. The reading target is a sheet-like object containing image information, such as a manuscript, printed matter, a banknote, a securities certificate, a film and other general documents.

Figure 2:
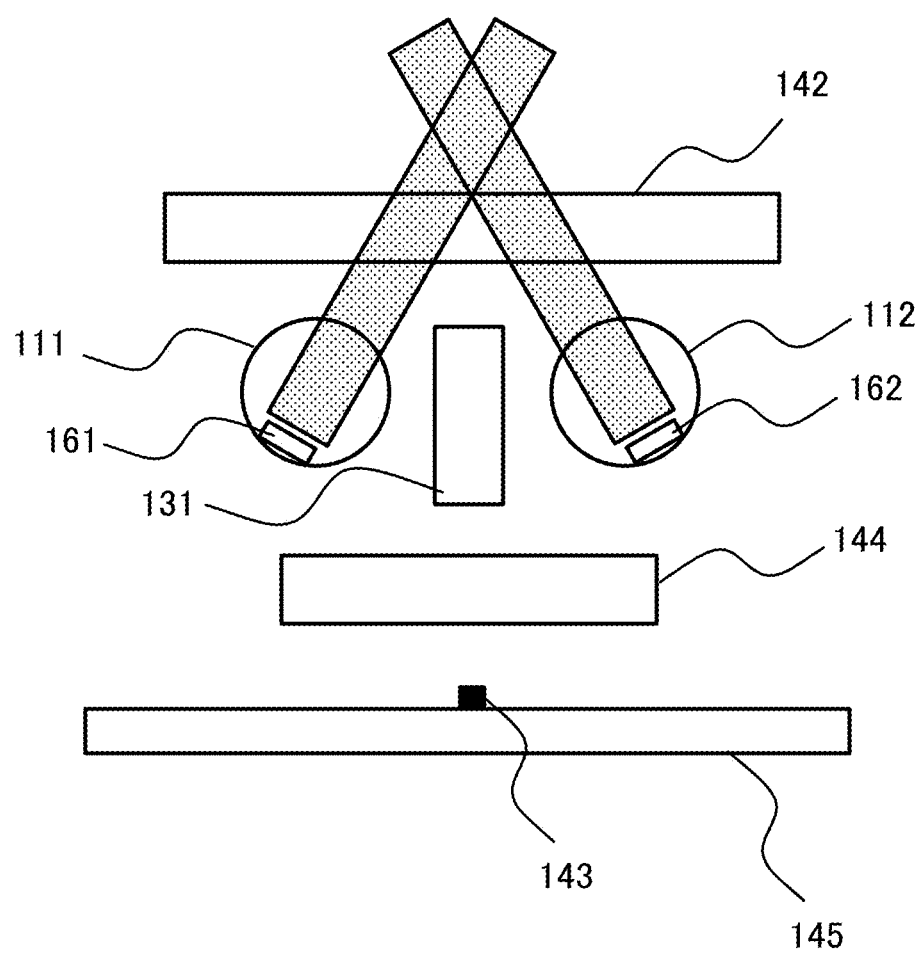
FIG. 2 is a schematic diagram illustrating radiation of light from light guides.

Each of the light guide 111 that is a first light guide and the light guide 112 that is a second light guide is a columnar transparent body and is made of, for example, a resin. The light guides 111 and 112 extend in the longitudinal direction, guide light entered from both the end surfaces, and emit linear light from the side surfaces. FIG. 2 is a schematic diagram illustrating radiation of light from the light guides 111 and 112. As illustrated in FIG. 2, reflective patterns 161 and 162 are formed at positions opposite to emission positions at which light is emitted.

The light entering from both the end surfaces of the light guides 111 and 112 is transmitted inside the light guides by repeated reflections, and light impinging on the reflective patterns 161 and 162 travels outside the light guides 111 and 112 from the side surfaces that are emission surfaces. Since the reflective patterns 161 and 162 are formed at positions opposite to the positions at which light is emitted, the light emitted by the light guides 111 and 112 is radiated onto a reading position on the cover 142. This configuration enables efficient radiation of the light entering from both the end surfaces of the light guides 111 and 112 onto the reading target located on the cover 142.

The reflective patterns 161 and 162 are any patterns that reflect the light entering into the light guides 111 and 112 and are, for example, two-dimensional prisms. The two-dimensional prisms cause diffusion of light inside the light guides 111 and 112 thereby enabling wide emission widths of the light guides 111 and 112, and thus enable irradiation of a range to be irradiated, even in a case of slight movement of a reading axis of the image sensor unit 100 due to variance in assembly.

Figure 3:
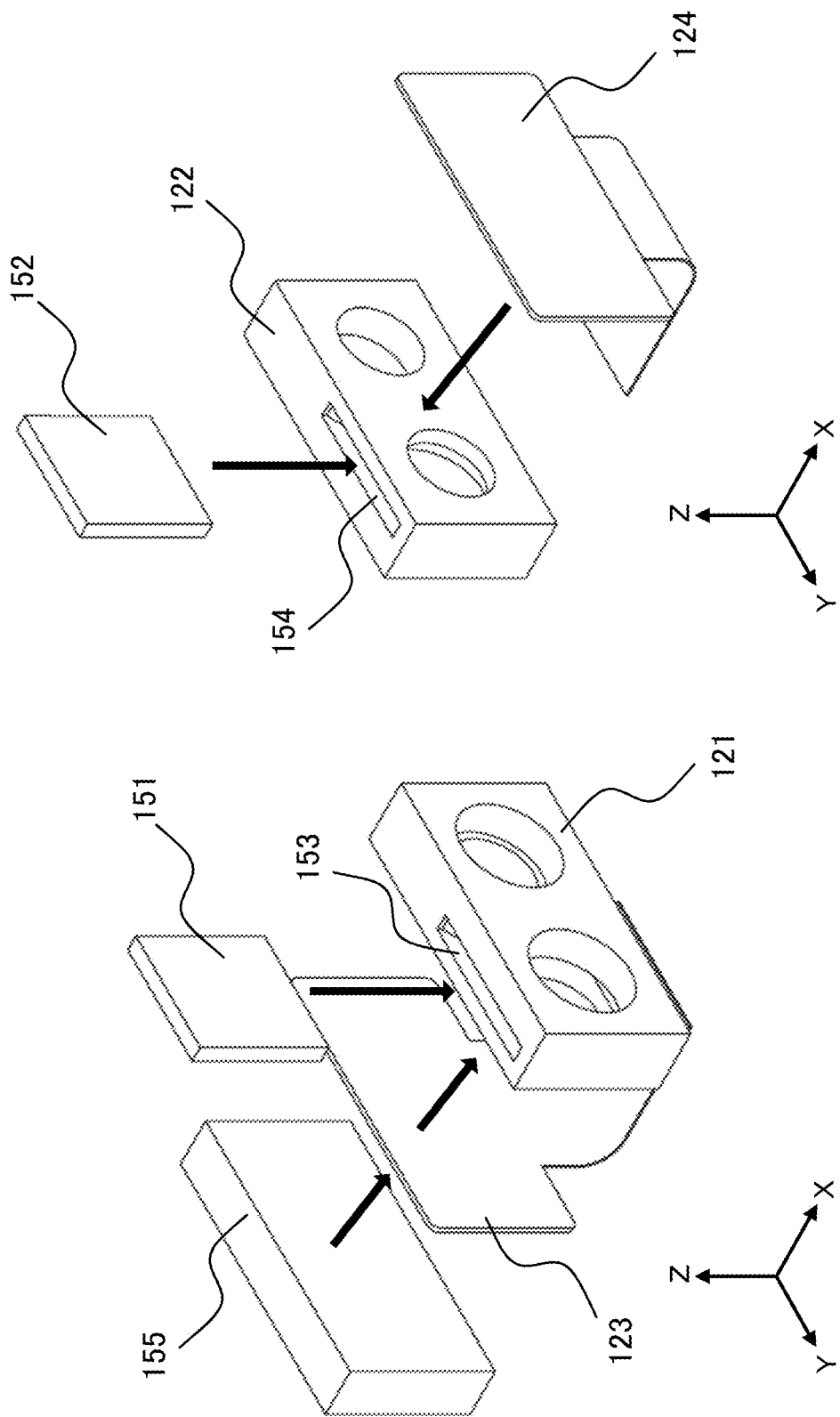
FIG. 3 is a perspective view of light guide holders and LED boards.

FIG. 3 is an enlarged perspective view of the light guide holders 121 and 122 and the LED boards 123 and 124. Each of the light guide holder 121 that is a first light guide holder and the light guide holder 122 that is a second light guide holder has two through-openings, and these openings receive the light guides 111 and 112 to hold the light guides 111 and 112. On the LED boards 123 and 124 are mounted, at positions facing the end surfaces of the light guide 111 held by the light guide holders 121 and 122, ultraviolet light-type LEDs that are a first light source. Further, on the LED boards 123 and 124 are mounted, at positions facing the end surfaces of the light guide 112 held by the light guide holders 121 and 122, visible light-type LEDs that are a second light source that emits non-ultraviolet light. The second light source may include multiple visible light-type LEDs of mutually different wavelengths.

A slit 153 for receiving the flat plate-like visible light cut filter 151 is formed in the light guide holder 121 in a direction perpendicular to an insertion direction of the light guide 111. A slit 154 for receiving the flat plate-like visible light cut filter 152 is formed in the light guide holder 122 in a direction perpendicular to an insertion direction of the light guide 111.

The visible light cut filters 151 and 152 are wavelength filters that attenuate light having a wavelength that is longer than a wavelength that falls within the wavelength range of ultraviolet light. The light emitted by the ultraviolet light-type LEDs incudes light having a wavelength of non-ultraviolet light. Due to the insertion of the visible light cut filters 151 and 152, among light emitted by the ultraviolet light-type LEDs mounted on the LED boards 123 and 124, light transmitted through the visible light cut filters 151 and 152 enters onto both the end surfaces of the light guide 111. That is to say, the light from the ultraviolet light-type LEDs passes, without exception, through the visible light cut filters 151 and 152 before entering into the light guide 111. Ultraviolet light entered into the light guide 111 is transmitted inside the light guide 111 by repeated reflections, and light impinging on the reflective pattern 161 travels outside the light guide 111 from the side surface that is the emission surface, thereby irradiating the reading target.

An elastic body 155 is disposed on a side of the light guide holder 121 opposite to the light guides 111 and 112. The frame 141 houses the elastic body 155 in addition to the light guides 111 and 112 and the light guide holders 121 and 122. Thus, even when lengths of the light guides 111 and 112 change in the longitudinal direction due to a variation in temperature, the elastic body 155 can absorb an amount of the change.

The visible light cut filters 151 and 152 are not arranged between the visible light-type LEDs and the end surfaces of the light guide 112. Thus, light emitted by the visible light-type LEDs directly enters into the light guide 112 and is transmitted inside the light guide 112 by repeated reflections, and light impinging on the reflective pattern 162 travels outside the light guide 112 from the side surface that is the emission surface, thereby irradiating the reading target.

The lens body 131 condenses, in the lateral direction, (i) fluorescence light generated on the reading target by irradiation by ultraviolet light or (ii) visible light reflected by the reading target as a result of irradiation by visible light. Pixels of the line sensor 143 are present at the position of focus of the lens body 131. The lens body 131 is any lens that extends in the longitudinal direction and forms a continuous image by condensing images in a direction perpendicular to the extending direction, and is, for example, a rod lens array of a large number of rod lenses arranged in an array along the longitudinal direction.

The frame 141 has a rectangular frame shape and houses the light guides 111 and 112 and the light guide holders 121 and 122. FIGS. 4A and 4B are external views of the image sensor unit 100. FIG. 4A is a perspective view as seen from above in the height direction, that is, the Z-axis direction, and FIG. 4B is a perspective view as seen from below in the height direction. As illustrated in FIG. 4A, the cover 142 covers at least a part of the opening of the frame 141 that faces the reading target. Further, as illustrated in FIG. 4B, the sensor board 145 covers at least a part of a bottom surface of the frame 141 on the side opposite to the cover 142. The sensor board 145 is fixed to the frame 141 by using fastener components 147. The fastener components 147 are, for example, screws.

The cover 142 includes a transparent plate 146 supported by an outer frame thereof. The transparent plate 146 does not limit transmission of the light emitted from the light guides 111 and 112. The cover 142 serves as a guide for jam-free conveying of the reading target. An image on the reading target moves on and relative to the transparent plate 146. The entire cover 142 may be formed by integral molding of a transparent material, and the outer frame may be omitted.

The line sensor 143 is an array-like sensor of a large number of sensor elements that are arranged along the longitudinal direction, that receive light condensed by the lens body 131, and that convert the light into an electric signal. Various types of electronic components, such as an external connector and a signal processing integrated circuit (an application specific integrated circuit, ASIC) are mounted on the sensor board 145, in addition to the line sensor 143. The signal processing IC may be disposed on a board other than the sensor board 145.

The ultraviolet light cut filter 144 is a flat plate-like wavelength filter and is a wavelength filter that attenuates ultraviolet light and light having a wavelength that is shorter than ultraviolet light wavelengths. The light condensed by the lens body 131 enters into the ultraviolet light cut filter 144, and the light emitted from the lens body 131 includes (i) fluorescence light generated by irradiation by ultraviolet light of the reading target and (ii) ultraviolet light emitted from the light guide 111 or reflected by the reading target. Although information obtained by receiving by the line sensor 143 the fluorescence light generated on the reading target includes the image information of the reading target, the receiving of ultraviolet light by the line sensor 143 results in a noise component. Cutting ultraviolet light by the ultraviolet light cut filter 144 enables reduction in the noise.

Figure 5:
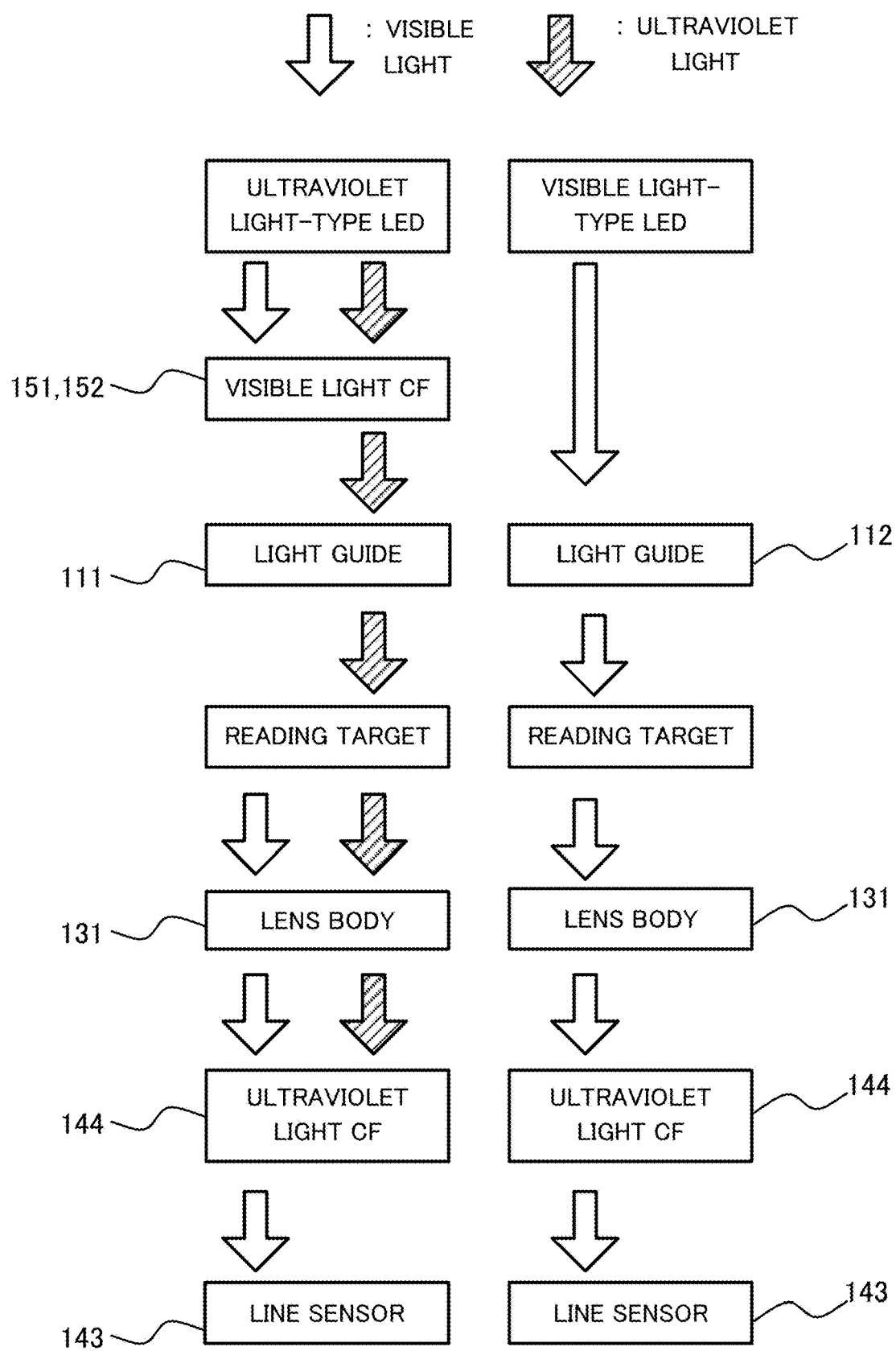
FIG. 5 illustrates behaviors of visible light and ultraviolet light.

Operations of the image sensor unit 100 that has the aforementioned configuration are described with reference to FIG. 5. FIG. 5 illustrates behaviors of visible light and ultraviolet light.

As illustrated in the left-side flow diagram of FIG. 5, the light radiated from the ultraviolet light-type LEDs mounted on the LED boards 123 and 134 passes through the visible light cut filters (CF) 151 and 152 and enters onto end portions of the light guide 111. This light, due to passing through the visible light cut filters 151 and 152, does not contain a visible light component. The visible light cut filters 151 and 152 actually blocks light having wavelengths longer than those of ultraviolet light. The light is transmitted inside the light guide 111 by repeated reflections, and upon impinging on the reflective pattern 161, travels outside the light guide 111 from the side surface that is the emission surface.

Thereafter, the light passes through the transparent plate 146 and is radiated onto the reading target. This light is ultraviolet light, and thus causes reaction of a fluorescent component of the reading target, thereby generating fluorescence light that falls within a range of visible light. A part of the ultraviolet light reflects as is. The fluorescence light and the reflected ultraviolet light pass through the transparent plate 146 again, and further pass through the lens body 131. The light passing through the lens body 131 is condensed to focus as an image at a pixel portion of the line sensor 143. Since the ultraviolet light cut filter (CF) 144 is disposed between the lens body 131 and the line sensor 143, the reflected ultraviolet light is blocked. This configuration allows each sensor element of the line sensor 143 to detect only the fluorescence light.

As illustrated in the right-side flow diagram of FIG. 5, the light radiated from the visible light-type LEDs mounted on the LED boards 123 and 134 enters onto end portions of the light guide 112 as is. This light is transmitted inside the light guide 112 by repeated reflections, and upon impinging on the reflective pattern 162, travels outside the light guide 112 from the side surface that is the emission surface. Thereafter, the light passes through the transparent plate 146 and is radiated onto the reading target. This light, upon impinging on and being reflected by the reading target, passes through the transparent plate 146 again, and further passes through the lens body 131. The light passing through the lens body 131 is condensed to focus as an image at the pixel portion of the line sensor 143. Although the ultraviolet light cut filter 144 is disposed between the lens body 131 and the line sensor 143, the light passing through the lens body 131 is not ultraviolet light and thus does not affect detection by the sensors. As described above, reflection light as a result of reflection of light emitted by the non-ultraviolet light-type LEDs is detectable without being affected by the ultraviolet light cut filter 144.

Light emission performed at the same time during image reading of the reading target is performed by only one type of LED, and the line sensor 143 performs type-by-type light detection as different types of LEDs are made to emit light in a predetermined order. The LEDs include non-ultraviolet light-type LEDs that have various types of wavelengths, such as red, blue, green, and infrared LEDs, and the type of LED that emits light is switched at every scanning for one line. For example, one set of scanning includes, in order, "red, blue, green, infrared, and ultraviolet", and the one set of scanning is performed with respect to one line and is thereafter repeated until completion of conveyance of the reading target, thereby enabling detection of reflection light and fluorescence light on the reading target as a result of light emission from each LED. The number of light emissions by each LED in one set is not necessarily limited to one, and the same LED may emit light more than once. For example, one set may include light emissions, in order, by "red, blue, infrared, red, green, and ultraviolet" LEDs.

In an image reading device that includes the image sensor unit 100 according to the present embodiment, another line sensor can be arranged opposite to the line sensor 143 across the reading target. In this case, light sources for transmission are mounted on the LED boards 123 and 124, and thus transmitted light is included in the order of light emission of the LEDs. For example, one set includes, in order, "red, blue, green, infrared, ultraviolet, and transmitted light". Further, since the number of types of the transmitted light is not necessarily limited to one, one set may include, in order, "red, blue, green, infrared, ultraviolet, first transmitted light, and second transmitted light". Although any light may be employed as the transmitted light, desirable transmitted light has a narrow range of emission wavelengths.

LEDs of different colors have mutually different levels of brightness. Thus, extending a light emission period for an LED having low brightness leads to extension of the accumulation period of sensor elements, thereby enabling obtaining a signal-noise (SN) ratio that is equal to that obtainable for other LEDs having higher brightness. Additionally, since brightness of an LED sometimes changes during long period of use of the line sensor 143, a configuration for monitoring brightness of LEDs may be included.

For example, monitoring of brightness of LEDs may be performed by arranging a white plate at a position opposite to the line sensor 143 with respect to the light guides 111 and 112 or placing a white tape on the transparent plate 146, and detecting, by the line sensor 143, light reflected by the white plate or the white tape. In the case of monitoring the intensity of ultraviolet light in the aforementioned configuration, a region for dedicated monitoring of brightness of LEDs is set, and the ultraviolet light cut filter 144 is not arranged at the region. This configuration enables monitoring of brightness of ultraviolet light-type LEDs. In the case of this configuration, an element that is free of fluorescent reactivity to ultraviolet light and that reflects ultraviolet light is selected as the white plate or tape. As another method, a method of monitoring brightness of LEDs by an illumination sensor arranged at a position within reach of light radiated from LEDs may be employed.

Next, a method for manufacturing the image sensor unit 100 is described. FIGS. 6-9 illustrate processes for manufacturing the image sensor unit 100.

Figure 6A:
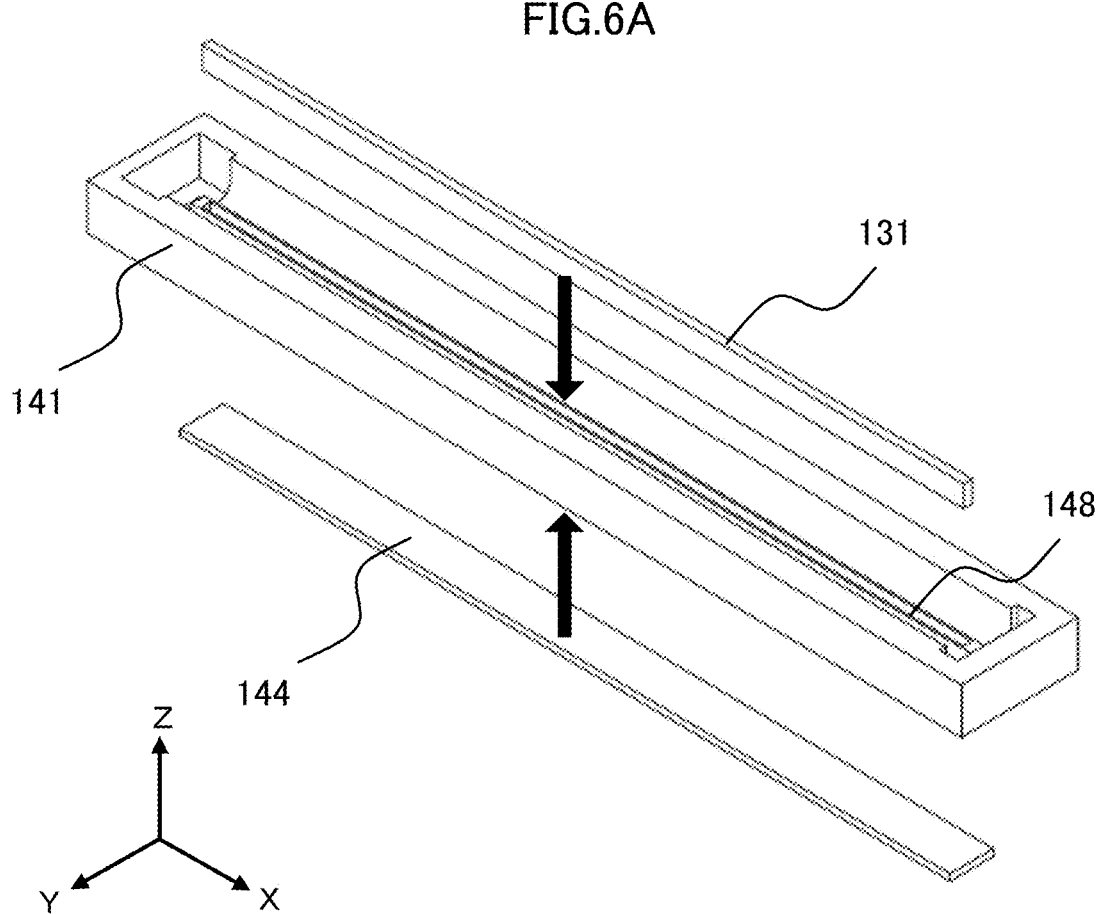
FIG. 6A is a perspective view illustrating a process for manufacturing the image sensor unit.
Figure 6B:
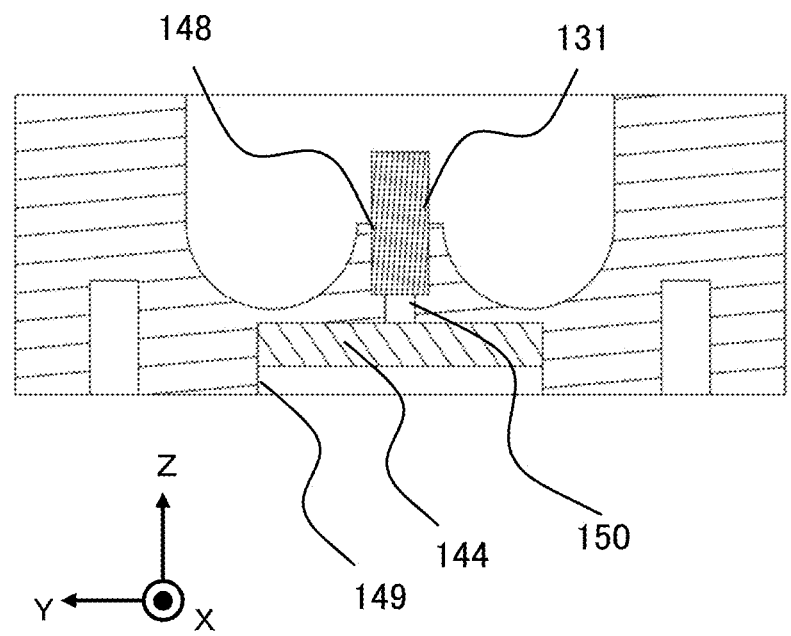
FIG. 6B is a cross-sectional view illustrating a process for manufacturing the image sensor unit.

First, as illustrated in FIGS. 6A and 6B, the lens body 131 and the ultraviolet light cut filter 144 are attached to the frame 141. FIG. 6A is a perspective view, and FIG. 6B is ad cross-sectional view taken along a surface perpendicular to the longitudinal direction. The frame 141 has a level difference portion 148 to which the lens body 131 is fitted and a level difference portion 149 to which the ultraviolet light cut filter 144 is fitted, and these elements are positioned by fitting to the level difference portions and are fixed using an adhesive. Further, the frame 141 has a slit 150 at an optical path below the lens body 131, and the light generated on the reading target passes, without exception, through the lens body 131 and the ultraviolet light cut filter 144.

Next, light source parts are assembled (a light source parts assembling step). The process of assembling the light source parts is described with reference to FIG. 3. First, the light guide holder 121 is bonded to the LED board 123 on which LEDs are mounted, and the light guide holder 122 is bonded to the LED board 124. This bonding is performed by, for example, fixing by heat welding or by an adhesive, although any method may be employed. Then, the elastic body 155 is fixed to the back of the LED board 123. Further, the visible light cut filter 151 is inserted into the slit 153 in the light guide holder 121 and is fixed, and the visible light cut filter 152 is inserted into the slit 154 in the light guide holder 122 and is fixed. This fixing is performed by, for example, bonding by an adhesive.

Figure 8:
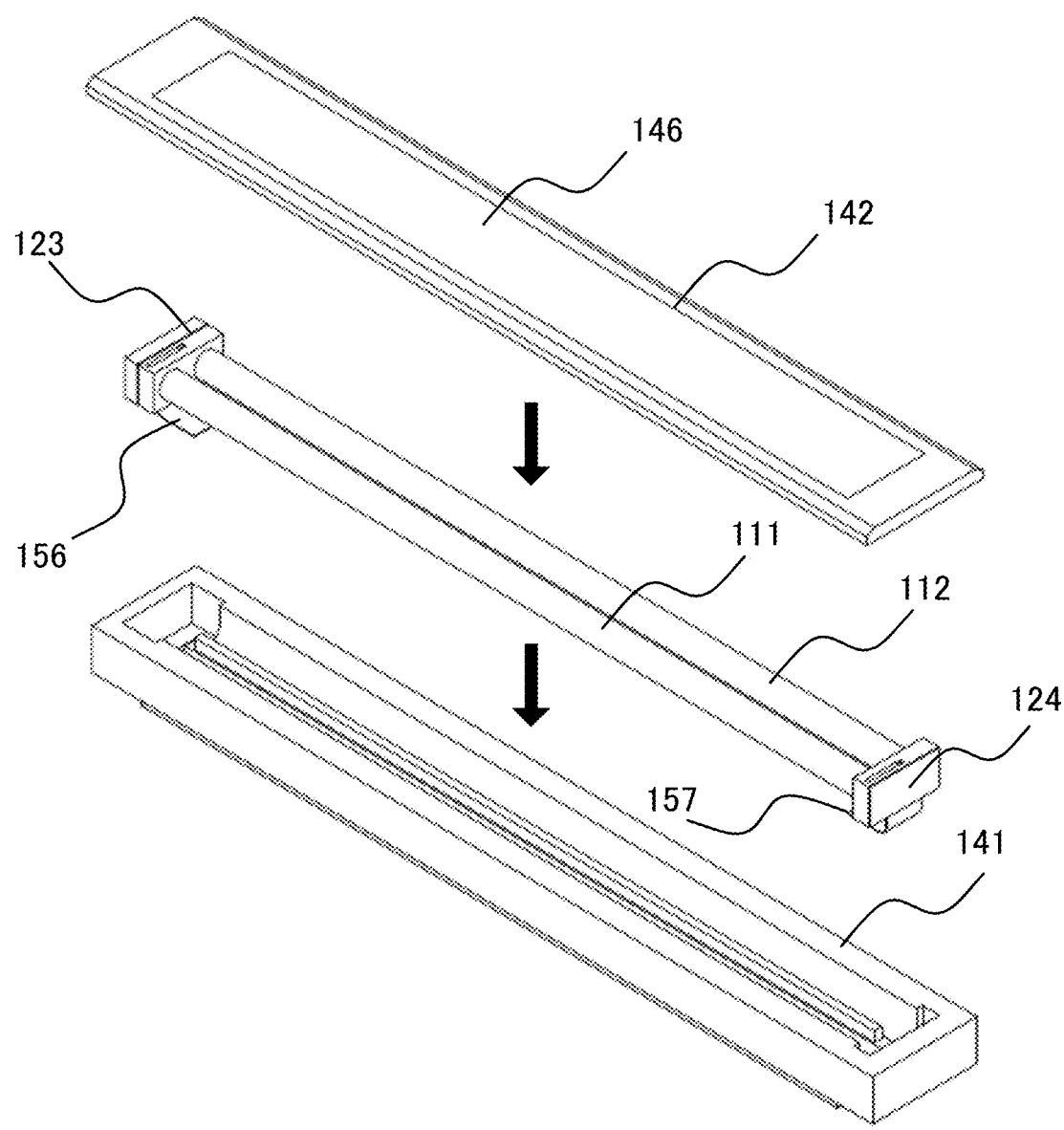
FIG. 8 illustrates a process for manufacturing the image sensor unit.

Next, as illustrated in FIG. 7, a light source unit is assembled by inserting the light guides 111 and 112 into the light source parts (a light source unit assembling step). Specifically, the light guides 111 and 112 are inserted into the openings of the light guide holders 121 and 122 and are fixed. Next, as illustrated in FIG. 8, the light source unit including the light guides 111 and 112 is incorporated into the frame 141 and is fixed (a light source unit fixing step). When incorporating the light source unit into the frame 141, in order to electrically connect the LED boards 123 and 124 to an external board, connector connection portions 156 and 157 of the LED boards 123 and 124 are passed through slits disposed at both ends of the frame 141 in the longitudinal direction so as to protrude outside the frame 141.

Thereafter, the cover 142 is attached to the opening of the frame 141 that faces the reading target (a cover attachment step). The cover 142 is fixed to the frame 141 after fixing of the transparent plate 146 to the outer frame. This fixing is performed by, for example, bonding by an adhesive.

Figure 9:
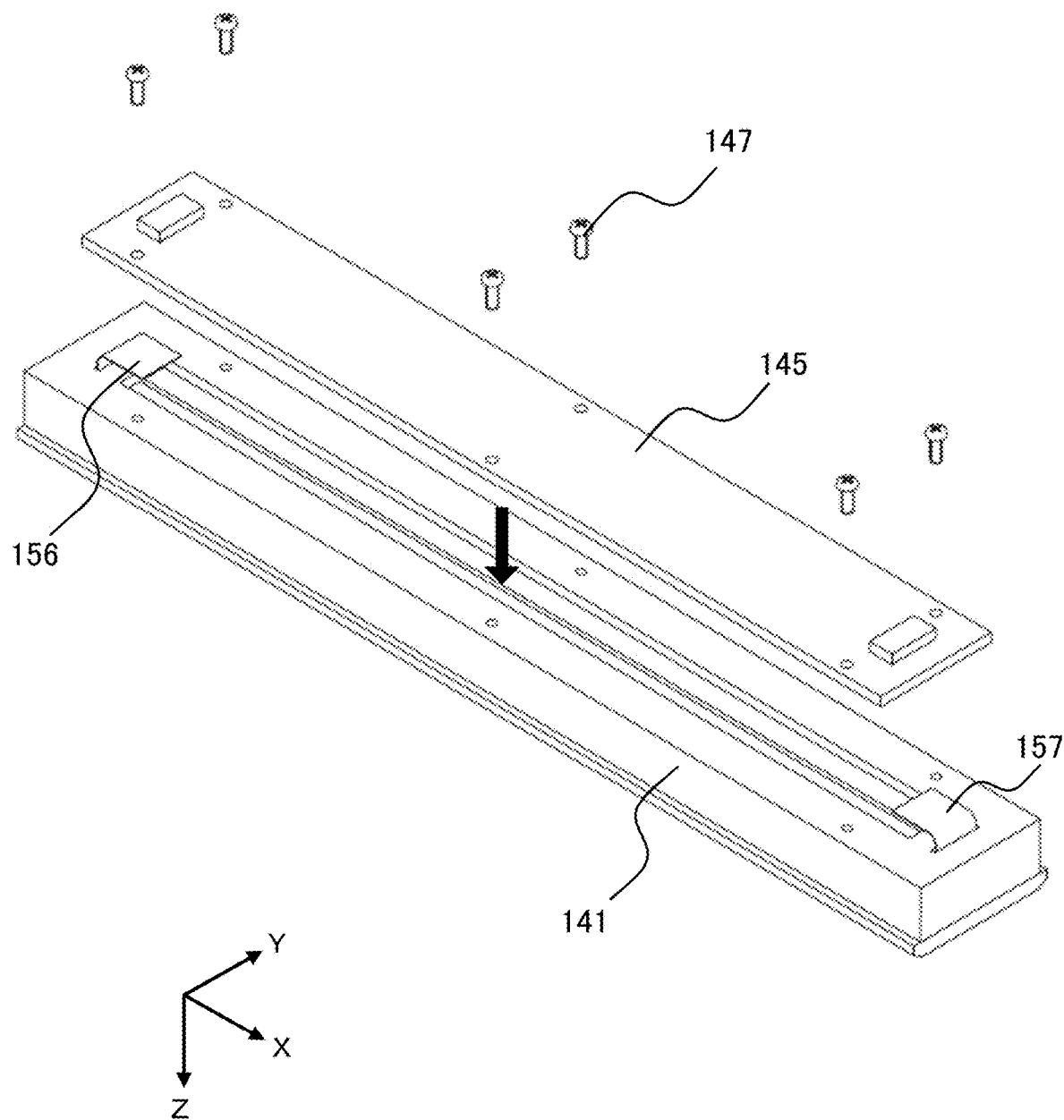
FIG. 9 illustrates a process for manufacturing the image sensor unit.

Finally, as illustrated in FIG. 9, the sensor board 145 is installed on the bottom surface of the frame 141 on the side opposite to the cover 142 (a sensor board installation step). The installation of the sensor board 145 is performed by using the fastener components 147. The fastener components are, for example, screws. The connector connection portions 156 and 157 of the LED boards 123 and 124 that protrude outside the frame 141 through the slits at both the ends thereof in the longitudinal direction are inserted into and electrically connected to a connector of the sensor board 145.

As described above, the image sensor unit 100 according to the present embodiment includes (i) the light guide 111 that guides light from the ultraviolet light-type LEDs mounted on the LED boards 123 and 124 and radiates the light toward the reading target from the side surface thereof and (ii) the light guide 112 that guides light from the visible light-type LEDs mounted on the LED boards 123 and 124 and radiates the light toward the reading target from the side surface thereof, and further includes (iii) the visible light cut filters 151 and 152 that are arranged between the ultraviolet light-type LEDs and the light guide 111 and that block visible light, (iv) the lens body 131 that condenses fluorescence light and reflection light generated on the reading target by light radiated from the light guides 111 and 112, (v) the line sensor 143 that receives light condensed by the lens body 131, and (vi) the ultraviolet light cut filter 144 that is arranged between the lens body 131 and the line sensor 143 and blocks ultraviolet light. This configuration, since the visible light cut filters 151 and 152 block a visible light component of the ultraviolet light-type LEDs and the ultraviolet cut filter 144 blocks a reflection component of ultraviolet light, enables low-noise detection of fluorescence light derived from ultraviolet light. Additionally, since the light emitted by the visible light-type LEDs passes through the ultraviolet cut filter 144 without passing through the visible light cut filters 151 and 152, stable detection by light of a non-ultraviolet wavelength can be achieved.

Embodiment 2

Figure 10:
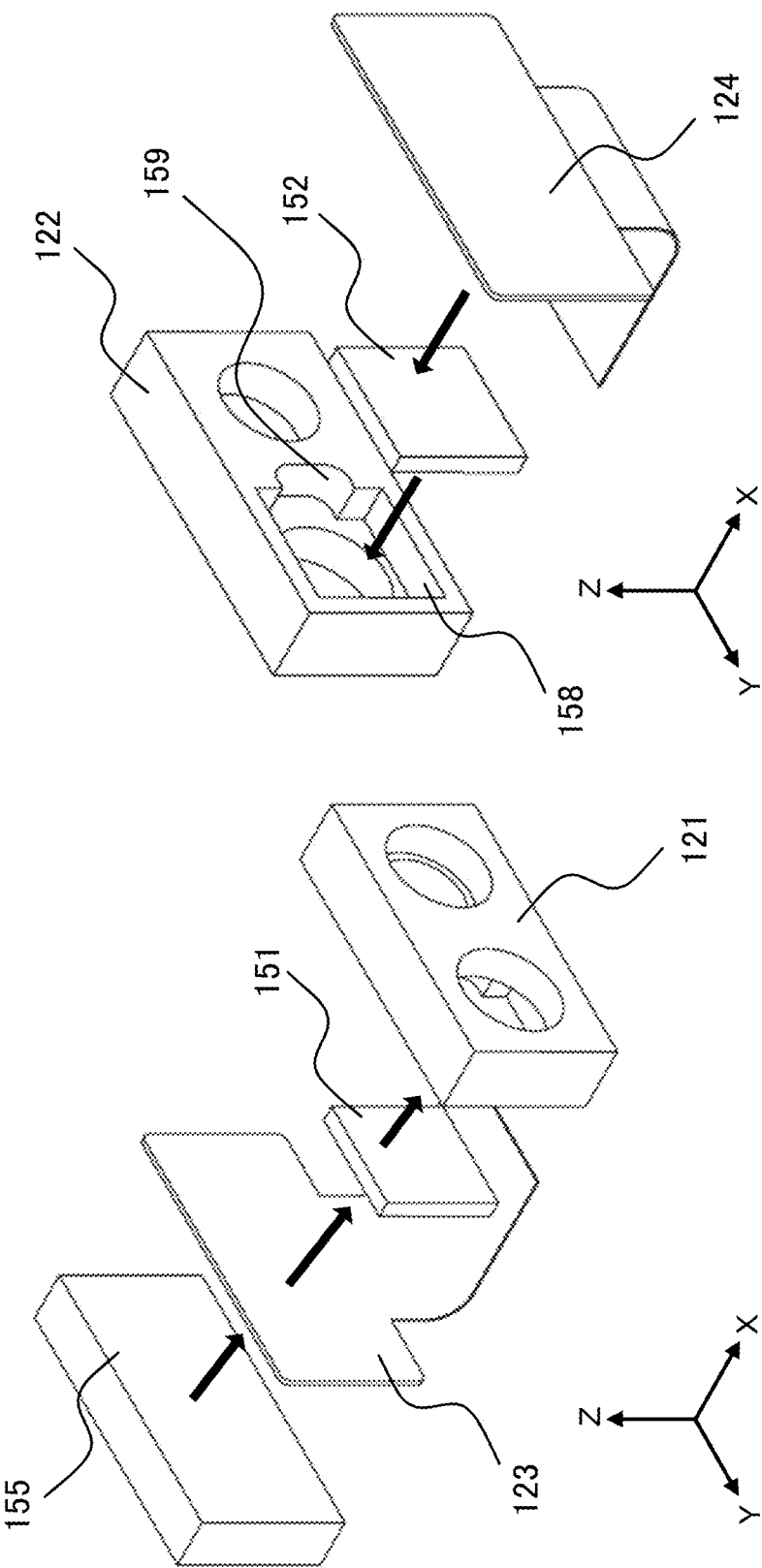
FIG. 10 is a perspective view of light guide holders and LED boards according to Embodiment 2.

Hereinafter, an image sensor unit 100 according to Embodiment 2 of the present disclosure is described with reference to the drawings. FIG. 10 is a perspective view of light guide holders 121 and 122 and LED boards 123 and 124 of the image sensor unit 100 according to Embodiment 2. The image sensor unit 100 according to Embodiment 2 is characterized by the configuration of the light guide holders 121 and 122. Configurations of elements included in the image sensor unit 100 and other than the light guide holders 121 and 122 are similar to those of Embodiment 1.

In Embodiment 1, the visible light cut filters 151 and 152 are inserted into the slits 153 and 154 disposed in the light guide holders 121 and 122 and are fixed. In Embodiment 2, as illustrated in FIG. 10, the light guide holder 122 has a level difference portion 158 at a surface thereof that faces the LED board 124, and the visible light cut filter 152 is fitted to the level difference portion 158.

A bonding groove 159 may be disposed in the level difference portion 158, and the visible light cut filter 152 may be fixed by, after the fitting of the visible light cut filter 152, pouring in of an adhesive from the bonding groove 159. Similarly, the visible light cut filter 151 is fitted to a level difference portion disposed at a surface of the light guide holder 121 that faces the LED board 123 and is fixed.

Operations of the image sensor unit 100 according to Embodiment 2 are similar to those of Embodiment 1.

A method for manufacturing the image sensor unit 100 according to Embodiment 2 is similar to that of Embodiment 1 and is different only in a method for installing the visible light cut filters 151 and 152 in the light source parts assembling step. Although the visible light cut filters 151 and 152 are inserted into the slits 153 and 154 disposed in the light guide holders 121 and 122 and are fixed in Embodiment 1, in Embodiment 2, the visible light cut filters 151 and 152 are fitted to the level difference portions disposed at the surfaces of the light guide holders 121 and 122 that face the LED boards 123 and 124, as illustrated in FIG. 10.

As described above, in the image sensor unit 100 according to the present embodiment, the visible light cut filter 151 is fitted to the level difference portion disposed at the surface of the light guide holder 121 that faces the LED board 123, and the visible light cut filter 152 is fitted to the level difference portion 158 disposed at the surface of the light guide holder 122 that faces the LED board 124. This configuration enables simplification of the manufacturing process including fixing of the visible light cut filters 151 and 152 by an adhesive.

Embodiment 3

Figure 11:
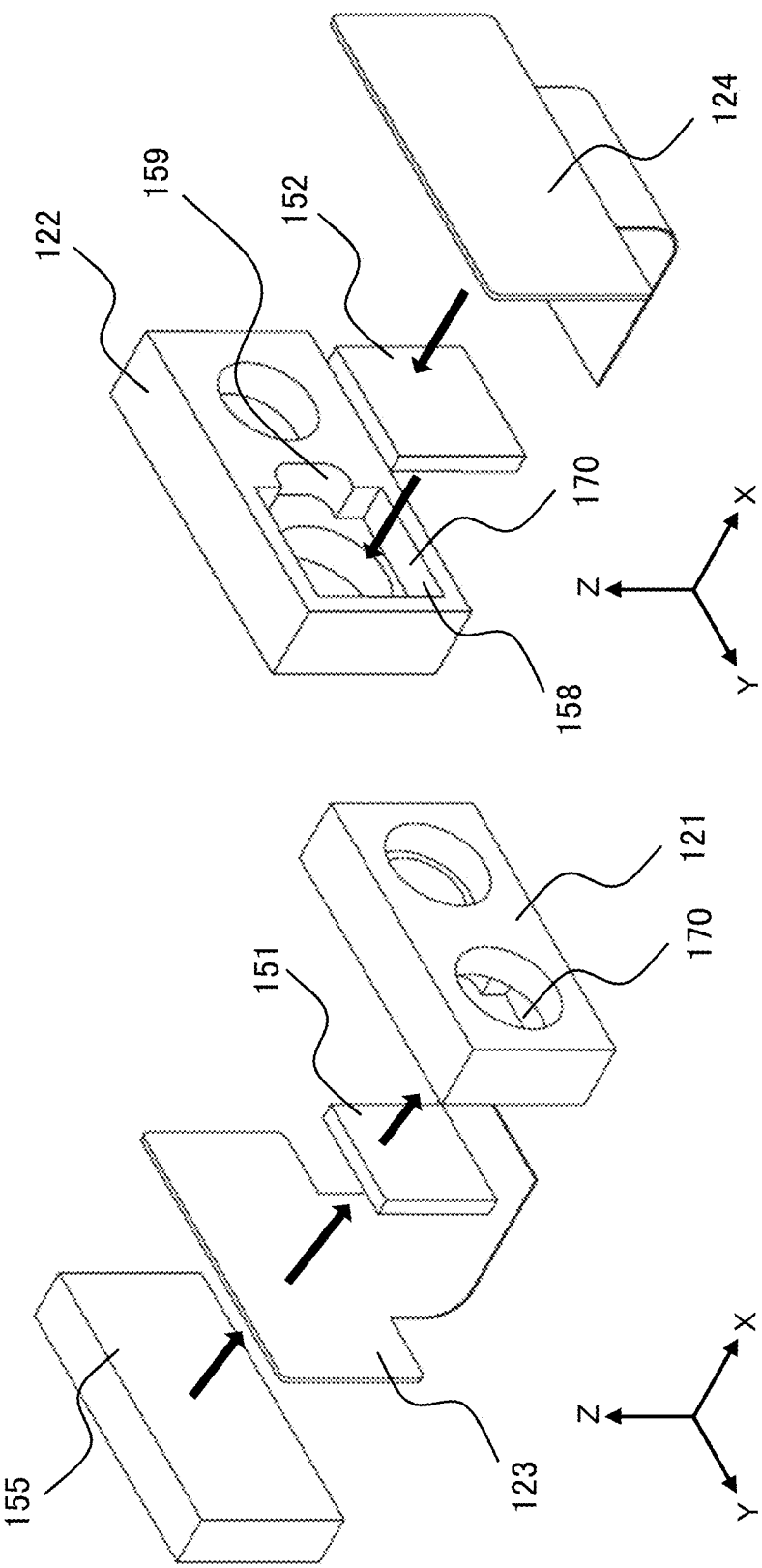
FIG. 11 is a perspective view of light guide holders and LED boards according to Embodiment 3.

Hereinafter, an image sensor unit 100 according to Embodiment 3 of the present disclosure is described with reference to the drawings. FIG. 11 is a perspective view of light guide holders 121 and 122 and LED boards 123 and 124 of the image sensor unit 100 according to Embodiment 3. The image sensor unit 100 according to Embodiment 3 is characterized by the configuration of the light guide holders 121 and 122. Configurations of elements included in the image sensor unit 100 and other than the light guide holders 121 and 122 are similar to those of Embodiment 2.

The material of at least the inner walls 170 of the light guide holders 121 and 122 of the image sensor unit 100 according to Embodiment 3 absorb visible light having wavelengths longer than those of ultraviolet light. For example, black inner walls 170 are desirable. The inner walls 170 are walls in the openings of the light guide holders 121 and 122 into which the light guides 111 and 112 are inserted, and may include the bonding groove 159.

The cut characteristics for blocking light are dependent on the incident angle for both of the visible light cut filters 151 and 152. The visible light cut filters 151 and 152 are, for example, dielectric multilayer filters. Based on the assumption that visible light having wavelengths longer than those of ultraviolet light and is included in light emitted from the ultraviolet light-type LEDs that are the first light source is reflected by the inner walls 170, an incident angle $\theta_{in}$ that is an angle at which the reflected visible light enters into the visible light cut filters 151 and 152 that are dielectric multilayer filters may possibly be larger than a threshold $\theta_{th}$ for incident angles of light that is blockable by the dielectric multilayer filters. In a case in which the incident angle $\theta_{in}$ is larger than the threshold $\theta_{th}$, the light reflected by the inner walls 170 and entered into the visible light cut filters 151 and 152 transmits through the visible light cut filters 151 and 152.

The image sensor unit 100 according to Embodiment 3 is provided with measures against the aforementioned problem. At least a part of visible light having wavelengths longer than those of ultraviolet light among the light emitted from the ultraviolet light-type LEDs is absorbed by the inner walls 170. That is to say, the inner walls 170 absorb visible light that, if reflected by the inner walls 170, becomes visible light that is transmittable through the visible light cut filters 151 and 152, in order to prevent generation of such visible light by reflection by the inner walls 170.

Figure 12:
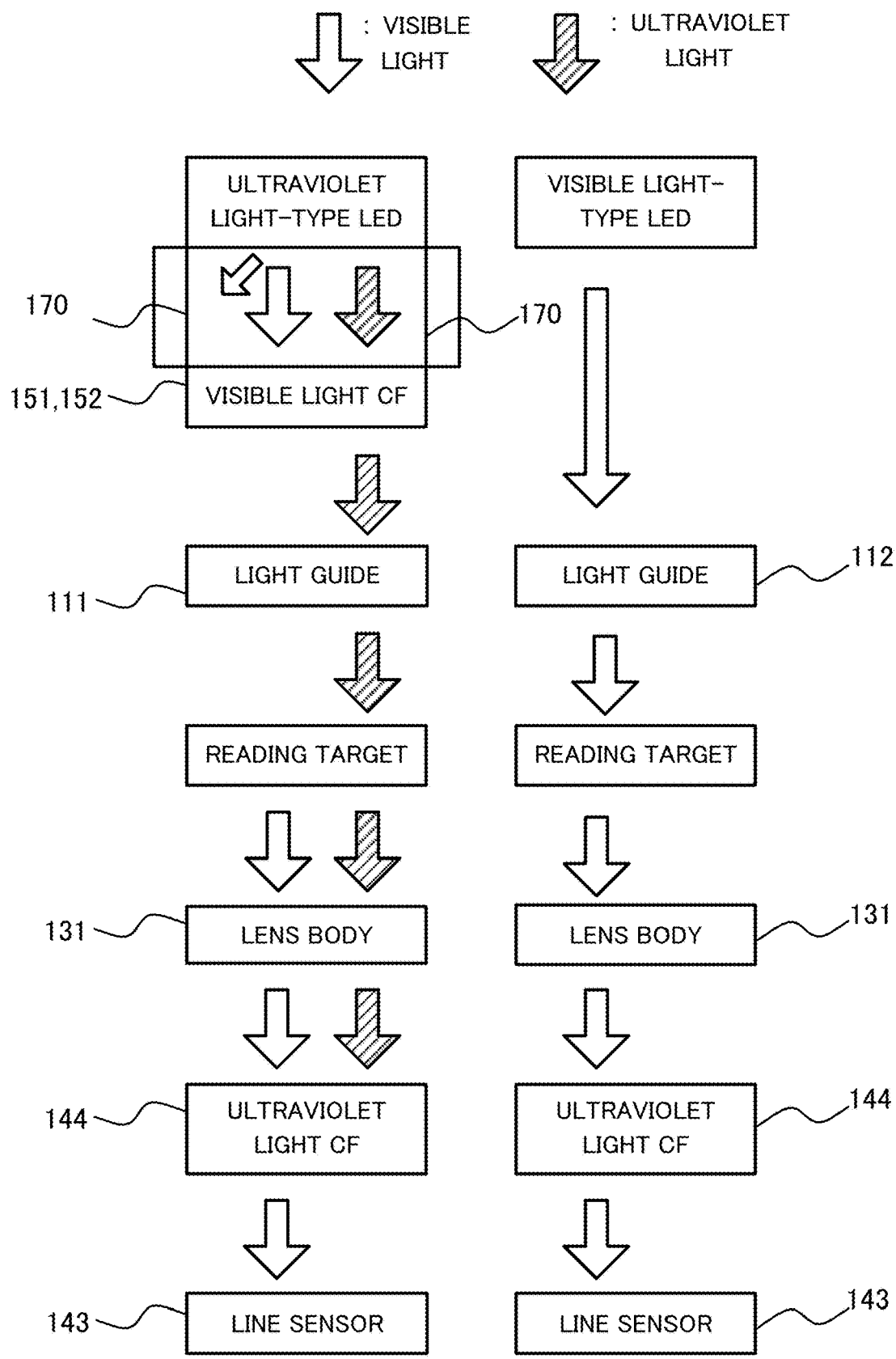
FIG. 12 illustrates behaviors of visible light and ultraviolet light in an image sensor unit according to Embodiment 3.

Operations of the image sensor unit 100 according to Embodiment 3 are described with reference to FIG. 12. FIG. 12 illustrates behaviors of visible light and ultraviolet light.

As illustrated in the left-side flow diagram of FIG. 12, although light radiated from the ultraviolet light-type LEDs mounted on the LED boards 123 and 124 includes ultraviolet light and visible light having wavelengths longer than those of ultraviolet light, visible light that is included in the visible light and travels in a direction of the inner walls 170 is absorbed by the inner walls 170. Among light from the ultraviolet light-type LEDs that directly enters into the visible light cut filters 151 and 152, ultraviolet light transmits through the visible light cut filters 151 and 152, whereas visible light having wavelengths longer than those of ultraviolet light is blocked by the visible light cut filters 151 and 152.

Operations thereafter are similar to those of Embodiment 1, that is, ultraviolet light transmitted through the visible light cut filters 151 and 152 is transmitted inside the light guide 111 by repeated reflections, and upon impinging on the reflective pattern 161, travels outside the light guide 111 from the side surface that is the emission surface. Thereafter, since the light radiated from the light guide 111 is ultraviolet light, this light causes reaction of a fluorescent component on the reading target, thereby generating fluorescence light that falls within a range of visible light. A part of the ultraviolet light reflects as is. Visible light due to the fluorescence light and the reflected ultraviolet light are condensed by the lens body 131 to focus as an image at the pixel portion of the line sensor 143. Since the ultraviolet light cut filter 144 is arranged between the lens body 131 and the line sensor 143, the reflected ultraviolet light is blocked, and each sensor element of the line sensor 143 detects only the fluorescent component transmitted through the ultraviolet light cut filter 144.

The behavior of light radiated from the visible light-type LEDs that is illustrated in the right-side flow diagram of FIG. 12 is similar to that of Embodiment 1.

A method for manufacturing the image sensor unit 100 according to Embodiment 3 is similar to that of Embodiment 1. In the light source parts assembling step, the inner walls 170 made of a material that absorbs visible light having wavelengths longer than those of ultraviolet light are arranged in the light guide holders 121 and 122 arranged between the light guide 111 and the visible light cut filters 151 and 152, and the visible light cut filters 151 and 152 that are filters having light cut characteristics that are dependent on incident angle are arranged in the light guide holders 121 and 122 at positions opposite to the ultraviolet light-type LEDs.

As described above, in the image sensor unit 100 according to the present embodiment, the cut characteristics of the visible light cut filters 151 and 152 are dependent on incident angle, and the inner walls 170 in the light guide holders 121 and 122 are made of a material that absorbs visible light having wavelengths longer than those of ultraviolet light. According to this configuration, the inner walls 170 absorb visible light that is emitted from the ultraviolet light-type LEDs and has wavelengths longer than those of ultraviolet light to suppress reflection of the visible light by the inner walls 170, thereby enabling avoiding occurrence of transmission through the visible light cut filters 151 and 152 due to an incident angle at which the visible light reflected by the inner walls 170 enters into the visible light cut filters 151 and 152 being larger than the blockable incident angles.

Embodiment 4

Hereinafter, an image sensor unit 100 according to Embodiment 4 of the present disclosure is described with reference to the drawings. The image sensor unit 100 according to Embodiment 4 is characterized by the configuration of the light guide holders 121 and 122. Configurations of elements included in the image sensor unit 100 and other than the light guide holders 121 and 122 are similar to those of Embodiment 2.

The material of at least the inner walls 170 of the light guide holders 121 and 122 of the image sensor unit 100 according to Embodiment 4 reflect ultraviolet light while maintaining the wavelength of the ultraviolet light. For example, a material that performs conversion into visible light by fluorescing in response to ultraviolet light is inappropriate for the inner walls 170. The inner walls 170 are walls in the openings of the light guide holders 121 and 122 into which the light guides 111 and 112 are inserted.

The inner walls 170 may include the bonding groove 159 or an adhesive.

The cut characteristics for blocking light are dependent on the incident angle for both of the visible light cut filters 151 and 152. The visible light cut filters 151 and 152 are, for example, dielectric multilayer filters. Based on the assumption that ultraviolet light that is included in light radiated from the ultraviolet light-type LEDs mounted on the LED boards 123 and 124 is reflected by the inner walls 170 and converted into visible light by fluorescing in response to ultraviolet light by the inner walls 170, an incident angle $\theta_{in}$ that is an angle at which the visible light due to the fluorescence light enters into the visible light cut filters 151 and 152 that are dielectric multilayer filters may possibly be larger than a threshold $\theta_{th}$ for incident angles of light that is blockable by the dielectric multilayer filters. In a case in which the incident angle $\theta_{in}$ is larger than the threshold $\theta_{th}$, the visible light reflected by the inner walls 170 and entered into the visible light cut filters 151 and 152 transmits through the visible light cut filters 151 and 152.

The image sensor unit 100 according to Embodiment 4 is provided with measures against the aforementioned problem. The ultraviolet light among the light emitted from the ultraviolet light-type LEDs is reflected by the inner walls 170 while maintaining the wavelength of ultraviolet light. That is to say, the inner walls 170 are configured for preventing occurrence of, by fluorescence by the inner walls 170, visible light that is transmittable through the visible light cut filters 151 and 152.

Visible light that is transmittable through the visible light cut filters 151 and 152 also occurs as a result of phenomenon similar to that described above in a case of using, as an adhesive used for fixing the visible light cut filters 151 and 152, an adhesive that, by irradiation with ultraviolet light, fluoresces, that is, performs conversion into visible light having wavelengths longer than those of ultraviolet light. Thus, a desirable adhesive used for fixing the visible light cut filters 151 and 152 is an adhesive that does not fluoresce in response to ultraviolet light. That is to say, a material that reflects ultraviolet while maintaining the wavelength of the ultraviolet light is to be used as the adhesive. In Embodiment 4, the inner walls 170 may include not only the walls in the openings in the light guide holders 121 and 122 and the bonding groove 159 but also the adhesive used for fixing the visible light cut filters 151 and 152.

Operations of the image sensor unit 100 according to Embodiment 4 are described with reference to FIG. 13. FIG. 13 illustrates behaviors of visible light and ultraviolet light.

As illustrated in the left-side flow diagram of FIG. 13, ultraviolet light among light radiated from the ultraviolet light-type LEDs mounted on the LED boards 123 and 124 is reflected by the inner walls 170 while the wavelength of the ultraviolet light is maintained. That is to say, both light from the ultraviolet light-type LEDs that directly enters into the visible light cut filters 151 and 152 and ultraviolet light reflected by the inner walls 170 transmit through the visible light cut filters 151 and 152, whereas visible light having wavelengths longer than those of ultraviolet light is blocked by the visible light cut filters 151 and 152.

Operations thereafter are similar to those of Embodiment 1, that is, ultraviolet light transmitted through the visible light cut filters 151 and 152 is transmitted inside the light guide 111 by repeated reflections, and upon impinging on the reflective pattern 161, travels outside the light guide 111 from the side surface that is the emission surface. Thereafter, since the light radiated from the light guide 111 is ultraviolet light, this light causes reaction of a fluorescent component on the reading target, thereby generating fluorescence light that falls within the range of visible light. A part of the ultraviolet light reflects as is. Visible light due to the fluorescence light and the reflected ultraviolet light are condensed by the lens body 131 to focus as an image at the pixel portion of the line sensor 143. Since the ultraviolet light cut filter 144 is arranged between the lens body 131 and the line sensor 143, the reflected ultraviolet light is blocked, and each sensor element of the line sensor 143 detects only the fluorescent component transmitted through the ultraviolet light cut filter 144.

The behavior of light radiated from the visible light-type LEDs that is illustrated in the right-side flow diagram of FIG. 13 is similar to that of Embodiment 1.

A method for manufacturing the image sensor unit 100 according to Embodiment 4 is similar to that of Embodiment 1. In the light source parts assembling step, the inner walls 170 made of a material that reflects ultraviolet light while maintaining the wavelength of the ultraviolet light are arranged between the light guide 111 and the visible light cut filters 151 and 152, and the visible light cut filters 151 and 152 that are filters having light cut characteristics that are dependent on incident angle are arranged in the light guide holders 121 and 122 at positions opposite to the ultraviolet light-type LEDs. The inner walls 170 include the bonding groove 159 or an adhesive.

As described above, in the image sensor unit 100 according to the present embodiment, the visible light cut filters 151 and 152 are dependent on incident angle, and the inner walls 170 in the light guide holders 121 and 122 are made of a material that reflects ultraviolet light while maintaining the wavelength of the ultraviolet light. This configuration, even in a case in which light that is emitted from the ultraviolet light-type LEDs and reflected by the inner walls 170 is transmitted through the visible light cut filters 151 and 152 due to an incident angle at which the light enters into the visible light cut filters 151 and 152 being larger than the blockable incident angles, enables suppressing transmission of visible light having wavelengths longer than those of ultraviolet light through the visible light cut filters 151 and 152, since the inner walls 170 reflect ultraviolet light while maintaining the wavelength of the ultraviolet light.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-184085 filed on Oct. 4, 2019, the entire disclosure of which is incorporated by reference herein.

REFERENCE SIGNS LIST

100 Image sensor unit
111, 112 Light guide
121, 122 Light guide holder
123, 124 LED board
131 Lens body
141 Frame
142 Cover
143 Line sensor
144 Ultraviolet light cut filter
145 Sensor board
146 Transparent plate
147 Fastener component
148, 149 Level difference portion
150 Slit
151, 152 Visible light cut filter
153, 154 Slit
155 Elastic body
156, 157 Connector connection portion
158 Level difference portion
159 Bonding groove
161, 162 Reflective pattern
170 Inner wall

The invention claimed is:

1. An image sensor unit comprising:
a first light source to emit light including ultraviolet light;
a second light source to emit light including visible light having wavelengths longer than those of ultraviolet light;
a columnar first light guide to guide the light emitted by the first light source from both end surfaces thereof and to radiate, from a side surface thereof, the light toward a reading target;
a columnar second light guide to guide the light emitted by the second light source from both end surfaces thereof and to radiate, from a side surface thereof, the light toward the reading target;
a visible light cut filter arranged between the first light source and the first light guide and to block the light including visible light having wavelengths longer than those of ultraviolet light;
a lens body to condense light generated on the reading target by the light radiated from the first light guide and the light radiated from the second light guide;
a line sensor to receive the light condensed by the lens body;
an ultraviolet light cut filter arranged between the lens body and the line sensor and to block ultraviolet light;
a first light guide holder that has two openings for receiving one end of the first light guide and one end of the second light guide; and a second light guide holder that has two openings for receiving another end of the first light guide and another end of the second light guide, wherein the visible light cut filter is arranged in one opening of the openings of the first light guide holder and in one opening of the openings of the second light guide holder, the first light guide being received by the one opening of the first light guide holder and by the one opening of the second light guide holder, each of the first light guide holder and the second light guide holder has a slit that is perpendicular to an insertion direction of the first light guide, and the slit receives the visible light cut filter.

2. The image sensor unit according to claim 1, further comprising:

a frame-shaped frame that houses the first light guide, the second light guide, and the lens body;

a cover that covers at least a part of an opening of the frame that faces the reading target and to allow transmission therethrough of the light radiated from the first light guide and the light radiated from the second light guide; and a sensor board on which the line sensor is mounted, the sensor board being a board covering at least a part of a bottom surface of the frame on a side opposite to the cover.

3. The image sensor unit according to claim 1, wherein the second light source includes two or more light sources of mutually different wavelengths, light emissions are performed by emitting, in a predetermined order, the ultraviolet light emitted by the first light source and light emitted by the two or more light sources of mutually different wavelengths that are included in the second light source, and the line sensor sequentially performs light detection for the light emissions.

4. The image sensor unit according to claim 1, wherein the visible light cut filter is a filter having a light cut characteristic that is dependent on incident angle, and each of the first light guide holder and the second light guide holder has an inner wall arranged between the first light guide and the visible light cut filter, the inner wall being made of a material that absorbs visible light having wavelengths longer than those of ultraviolet light.

5. The image sensor unit according to claim 1, wherein the visible light cut filter is a filter having a light cut characteristic that is dependent on incident angle, and each of the first light guide holder and the second light guide holder has an inner wall arranged between the first light guide and the visible light cut filter, the inner wall being made of a material that, by reflecting ultraviolet light while maintaining a wavelength of the ultraviolet light, prevents occurrence of visible light by fluorescence.

6. An image sensor unit comprising:

a first light source to emit light including ultraviolet light;

a second light source to emit light including visible light having wavelengths longer than those of ultraviolet light;

a columnar first light guide to guide the light emitted by the first light source from both end surfaces thereof and to radiate, from a side surface thereof, the light toward a reading target;

a columnar second light guide to guide the light emitted by the second light source from both end surfaces thereof and to radiate, from a side surface thereof, the light toward the reading target;

a visible light cut filter arranged between the first light source and the first light guide and to block the light including visible light having wavelengths longer than those of ultraviolet light;

a lens body to condense light generated on the reading target by the light radiated from the first light guide and the light radiated from the second light guide;

a line sensor to receive the light condensed by the lens body;

an ultraviolet light cut filter arranged between the lens body and the line sensor and to block ultraviolet light;

a first light guide holder that has two openings for receiving one end of the first light guide and one end of the second light guide; and a second light guide holder that has two openings for receiving another end of the first light guide and another end of the second light guide, wherein the visible light cut filter is arranged in one opening of the openings of the first light guide holder and in one opening of the openings of the second light guide holder, the first light guide being received by the one opening of the first light guide holder and by the one opening of the second light guide holder, the visible light cut filter is a filter having a light cut characteristic that is dependent on incident angle, and each of the first light guide holder and the second light guide holder has an inner wall arranged between the first light guide and the visible light cut filter, the inner wall being made of a material that absorbs visible light having wavelengths longer than those of ultraviolet light.

7. The image sensor unit according to claim 6, wherein the inner wall absorbs visible light to prevent generation of reflected visible light that (i) is generated if the visible light having wavelengths longer than those of ultraviolet light and is emitted from the first light source is reflected by the inner wall and (ii) is transmittable through the visible light cut filter when an incident angle at which the reflected visible light enters into the visible light cut filter is larger than blockable incident angles of the visible light cut filter, thereby suppressing the reflected visible light from reaching the visible light cut filter.

8. The image sensor unit according to claim 6, wherein each of the first light guide holder and the second light guide holder has, at a surface thereof facing the first light source, a level difference portion enclosing the one opening for receiving the first light guide, and the visible light cut filter is disposed so as to be fitted to the level difference portion.

9. The image sensor unit according to claim 6, further comprising:

a frame-shaped frame that houses the first light guide, the second light guide, and the lens body;

a cover that covers at least a part of an opening of the frame that faces the reading target and to allow transmission therethrough of the light radiated from the first light guide and the light radiated from the second light guide; and a sensor board on which the line sensor is mounted, the sensor board being a board covering at least a part of a bottom surface of the frame on a side opposite to the cover.

10. The image sensor unit according to claim 6, wherein the second light source includes two or more light sources of mutually different wavelengths, light emissions are performed by emitting, in a predetermined order, the ultraviolet light emitted by the first light source and light emitted by the two or more light sources of mutually different wavelengths that are included in the second light source, and the line sensor sequentially performs light detection for the light emissions.

11. An image sensor unit comprising:

a first light source to emit light including ultraviolet light;

a second light source to emit light including visible light having wavelengths longer than those of ultraviolet light;

a columnar first light guide to guide the light emitted by the first light source from both end surfaces thereof and to radiate, from a side surface thereof, the light toward a reading target;

a columnar second light guide to guide the light emitted by the second light source from both end surfaces thereof and to radiate, from a side surface thereof, the light toward the reading target;

a visible light cut filter arranged between the first light source and the first light guide and to block the light including visible light having wavelengths longer than those of ultraviolet light;

a lens body to condense light generated on the reading target by the light radiated from the first light guide and the light radiated from the second light guide;

a line sensor to receive the light condensed by the lens body;

an ultraviolet light cut filter arranged between the lens body and the line sensor and to block ultraviolet light;

a first light guide holder that has two openings for receiving one end of the first light guide and one end of the second light guide; and a second light guide holder that has two openings for receiving another end of the first light guide and another end of the second light guide, wherein the visible light cut filter is arranged in one opening of the openings of the first light guide holder and in one opening of the openings of the second light guide holder, the first light guide being received by the one opening of the first light guide holder and by the one opening of the second light guide holder, the visible light cut filter is a filter having a light cut characteristic that is dependent on incident angle, and each of the first light guide holder and the second light guide holder has an inner wall arranged between the first light guide and the visible light cut filter, the inner wall being made of a material that, by reflecting ultraviolet light while maintaining a wavelength of the ultraviolet light, prevents occurrence of visible light by fluorescence.

12. The image sensor unit according to claim 11, wherein each of the first light guide holder and the second light guide holder has, at a surface thereof facing the first light source, a level difference portion enclosing the one opening for receiving the first light guide, and the visible light cut filter is disposed so as to be fitted to the level difference portion.

13. The image sensor unit according to claim 11, further comprising:

a frame-shaped frame that houses the first light guide, the second light guide, and the lens body;

a cover that covers at least a part of an opening of the frame that faces the reading target and to allow transmission therethrough of the light radiated from the first light guide and the light radiated from the second light guide; and a sensor board on which the line sensor is mounted, the sensor board being a board covering at least a part of a bottom surface of the frame on a side opposite to the cover.

14. The image sensor unit according to claim 11, wherein the second light source includes two or more light sources of mutually different wavelengths, light emissions are performed by emitting, in a predetermined order, the ultraviolet light emitted by the first light source and light emitted by the two or more light sources of mutually different wavelengths that are included in the second light source, and the line sensor sequentially performs light detection for the light emissions.

\* \* \* \* \*